US008052037B2

(12) United States Patent
Bussey, III et al.

(10) Patent No.: US 8,052,037 B2
(45) Date of Patent: Nov. 8, 2011

(54) PAPER PRODUCTS FOR DUNNAGE AND PACKAGING AND METHOD OF MAKING SAME

(76) Inventors: Buddy Harry Bussey, III, Atlantic Highlands, NJ (US); Harry Bussey, Jr., Marco Island, FL (US)

( * ) Notice: Subject to any disclaimer, the term of this patent is extended or adjusted under 35 U.S.C. 154(b) by 890 days.

(21) Appl. No.: 12/080,103

(22) Filed: Apr. 1, 2008

(65) Prior Publication Data

US 2009/0247382 A1 Oct. 1, 2009

(51) Int. Cl.
*B65D 81/03* (2006.01)
*B32B 3/28* (2006.01)
*B32B 7/12* (2006.01)

(52) U.S. Cl. ....................... 229/87.02; 428/182; 428/343

(58) Field of Classification Search ............... 229/87.02, 229/90; 428/182, 184, 343, 354
See application file for complete search history.

(56) References Cited

U.S. PATENT DOCUMENTS 3,203,618 A * 8/1965 Andrews et al. ........... 229/103.2
3,224,159 A * 12/1965 Pitt et al. ......................... 53/397
3,288,353 A * 11/1966 McCullough .............. 229/87.02
4,030,662 A * 6/1977 Gess ........................ 229/125.35
4,064,792 A * 12/1977 Gess ............................... 493/60
4,369,885 A * 1/1983 Redmond ...................... 206/484
4,680,918 A * 7/1987 Lovell ............................. 53/466
5,704,481 A * 1/1998 Lutz .............................. 206/484
5,849,394 A * 12/1998 Bussey et al. ................. 428/178
6,071,574 A * 6/2000 Weder ............................. 428/17
6,085,904 A * 7/2000 Perdue, Jr. ..................... 206/484
2003/0027702 A1* 2/2003 Weder ........................... 493/463
2005/0214512 A1* 9/2005 Fascio ........................... 428/182
2006/0231446 A1* 10/2006 Venis ............................ 206/460
* cited by examiner

*Primary Examiner* — Jes F Pascua
(74) *Attorney, Agent, or Firm* — Francis C. Hand; Carella, Byrne, Cecchi

(57) ABSTRACT

A paper product may be made as a crumpled paper strip provided with a layer of coadhesive on one side to adhere opposed portions of the strip together in a strong manner to form a dunnage material. The paper product may also be made as a packaging wrap of two-ply construction with the corrugations of a corrugated ply adhered to a flat ply via a coadhesive on both plies. The paper product may also be made as small discrete elements. The apparatus for making the packaging wrap employs a pair of rolls with interengaging projections to form corrugations in a sheet of material coated with a coadhesive and guides for adhering the corrugated sheet to a flat sheet of material.

6 Claims, 3 Drawing Sheets

PAPER PRODUCTS FOR DUNNAGE AND PACKAGING AND METHOD OF MAKING SAME

This invention relates to paper products for dunnage and packaging and a method of making the same.

As is known, various types of paper packaging's and dunnage materials have been employed for the packaging of items, particularly fragile items. For example, U.S. Pat. Nos. 1,940,596 and 6,871,480 describe packaging made of pleated sheets of materials for the packaging of various types of items. U.S. Pat. Nos. 3,509,797; 3,613,522 and 5,131,903 describe various types of cushioning dunnage made of strips of paper that can be crumpled width-wise. In the case of the crumpled paper described in U.S. Pat. No. 5,131,903, crumpling and crimping of the paper is intended to substantially maintain the paper in a compacted form.

In some instances, the machines for making dunnage materials in pleated paper sheet form or as crumbled strips of paper have been of relatively large bulk. In those cases, the machines have been located at places remote from the place of ultimate use of the dunnage materials and the dunnage materials have been separately shipped to the places of ultimate use.

Dunnage materials made of foamed plastic have also been known for packing and packaging purposes. However, these materials have not been biodegradable and pose a disposal problem from an ecological standpoint.

Accordingly, it is an object of this invention to provide dunnage material which can be easily fabricated and used in a crumpled manner.

It is an another object of the invention to provide a crumpled strip of dunnage that will retain a crumpled shape in a permanent manner It is another object of the invention to provide a dunnage material of discrete element made of paper.

It is an object of the invention to provide an apparatus of compact construction for dispensing a packaging wrap on an as-needed basis at a place of ultimate use.

Briefly, the invention provides a paper product for use as a dunnage material that is comprised of an elongated paper strip having a coadhesive on one surface and that is characterized in being crumpled at least transversely with opposed intermediate portions of the strip adhered together. In this respect, the nature of the coadhesive is such that, after drying, the adhesive does not readily adhere to objects which are of different chemical formulation than itself. However, the coadhesive adheres very strongly when in contact with another object having the same adhesive applied to it and allowed to dry. Such coadhesives are known, for example from U.S. Pat. Nos. 4,430,843 and 7,037,564.

The coadhesive may be applied on the surface of the paper as a continuous layer or in a predetermined pattern of spaced apart spots. When the paper strip is crumpled, the coadhesive on different portions of the paper strip adhere to each other to maintain the crumpled state of the paper strip in a permanent manner.

In another embodiment, the invention provides a paper product for use as a packaging wrap that is comprised of at least one flat sheet of material having a coadhesive on one surface and a corrugated sheet of material with a coadhesive on at least some of the corrugations adhering to the coadhesive on the flat sheet thereby making the wrap stronger in a bridge effect. In this respect, the packaging wrap is of two-ply construction.

The packaging wrap may be used in flat sheet form and may be made of any suitable size, for example, in rectangular or square sizes to fit between a wall of a carton and an item to be packaged in the carton or to be wrapped about an item to be packaged.

The packaging wrap may also be provided in a roll for unwinding and cutting to a length suitable for packaging purposes.

The invention also provides a compact apparatus for forming the packaging wrap that can be used at the point of ultimate use. This apparatus includes a housing and means within the housing for mounting two rolls of paper, each of which is coated with a layer of coadhesive on one side, for unwinding of a paper stream from each roll in a synchronized manner.

In addition, the apparatus includes a pair of rotatably mounted parallel rollers for receiving and conveying one of the paper streams sheet therebetween. Each of these rollers has a plurality of circumferentially spaced apart corrugations for interengaging with the corrugations of the other roller in order to impart a plurality of parallel pleats or corrugations in the paper stream conveyed therebetween.

Alternatively, the two rollers may be differently formed in order to impart other deformed shapes in the stream of paper. For example, instead of imparting parallel corrugations, the rolls may be formed to impart a chevron-shaped array of corrugations.

In addition, the apparatus includes a plurality of guides, such as rollers or pins, for guiding the two streams of paper with the coadhesive sides facing each other and into contact with each other downstream from the point which the one sheet is corrugated in order to adhere the coadhesive on the corrugations of the one stream to the coadhesive of the other stream thereby forming a continuous stream of packaging wrap.

The apparatus may also be provided with a cutting device, such as a serrated tear knife, for cutting the continuous stream of packaging wrap into discrete lengths.

Further, in order to ensure that the formed packaging wrap down not stick within the corrugations of the downstream corrugated roller and is removed from the downstream corrugated roller, the corrugated roller is provided with two or more annular grooves of greater depth than the depth of the corrugations and a corresponding number of thin stationary stripping fingers are positioned in line with the grooves to lift the packaging wrap out of the corrugations as the roller rotates past the stripping fingers.

The apparatus may be employed at a point of use so that the discrete lengths of the packaging wrap can be made on a demand basis for wrapping items that are to be packaged in a shipping carton or the like.

In still another embodiment, the invention provides a packaging wrap of multi-ply construction having coadhesive on two oppositely disposed surfaces. This packaging wrap may be wound about an item with the ends of the wrap adhered to each other to enclose the item. The packaging wrap is comprised of a flat sheet that has a coadhesive on an exposed surface and a heat sensitive glue on an opposite surface and a corrugated sheet that has corrugations adhered to the heat sensitive glue on the flat sheet and a coadhesive on the opposite exposed surfaces of the corrugations. The flat sheet may be made of any suitable material. For example, where the flat sheet is made of paper, the heat sensitive glue may be a plastic with a low melting point, such as a polyethylene with a melt index of from 3 to 40, and may be coated onto one side of the paper. In any event, this packaging wrap may be fabricated in the above-described apparatus with one or both of the corrugated rollers being heated to a degree sufficient to activate the heat sensitive glue to adhere the two sheets together.

The multi-ply packaging wrap may also have additional corrugated plies with coadhesive on one side adhered to the exposed coadhesive surface of the base wrap. In this way, the plies of the wrap may number, three, four, five or more.

The above-described apparatus may be further provided with a plurality of slitters for slitting the corrugated wrap into a plurality of thin parallel strips and a chopper for chopping the strips into individual discrete pieces of dunnage. The resulting dunnage pieces are characterized in having a coadhesive on two opposite surfaces and can be used for packaging items within cartons and the like. For example, an opened carton may be placed at the exit of the above-described apparatus to receive a layer of discrete dunnage pieces. Since these pieces have coadhesive on the exposed surfaces, when the pieces come into contact with each other, the pieces will adhere together into a cohesive mass. Thereafter, if desired, a thin sheet or film of plastic may be laid over the layer of coadhered pieces to act as a separator and an item placed on the film. Next, a thin sheet or film of plastic may be laid over the item to act as a separator. The remainder of the carton is then filled with further dunnage pieces from the apparatus and the carton closed for shipping purposes or the like. When the carton arrives at a shipping destination, the carton can be opened and the top mass of adhered together dunnage elements removed. Then, the separator film is removed to expose the packaged item to view and for removal. The remaining separator film and mass of dunnage elements may then be removed.

These and others objects and advantages will become more apparent from the following detailed description taken in conjunction with the accompanying drawings where in.

Figure 1:
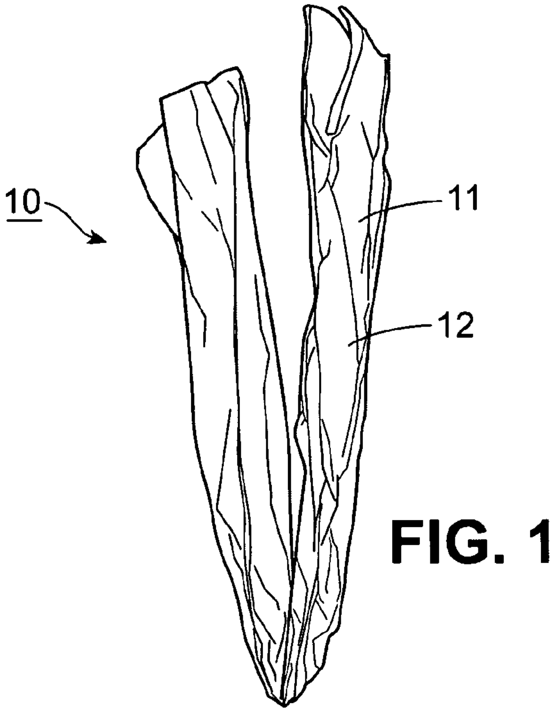
FIG. 1 illustrates a perspective view of a crumpled paper strip constructed in accordance with the invention.

Referring to FIG. 1, the paper product for use as a dunnage material 10 is formed of an elongated paper strip 11 that is crumpled in a transverse direction and that may be folded over at an intermediate point along the length of the strip 11, for example, into a V-shape, when put into place, for example, between the wall of a carton and an item being packaged in the carton.

Figure 2:
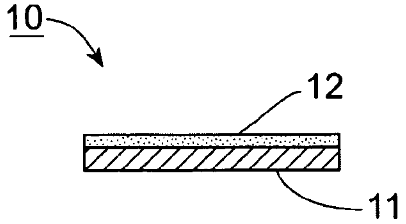
FIG. 2 illustrates a cross-sectional view of the paper strip of FIG. 1.

Referring to FIG. 2, the paper strip 11 has a coadhesive 12 on one surface that may be in a form of a continuous layer, as shown, over the entire surface of the paper strip 11 or may be in a form of a pattern of spaced apart spots (not shown).

As illustrated, the paper strip 11 is crumpled in a transverse direction with opposed intermediate portions of the surface having the coadhesive 12 thereon adhered together via the coadhesive. The nature of the coadhesive 12 is such that, after drying, the coadhesive 12 does not readily adhere to objects which are of different chemical formulation than itself. However, the coadhesive 12 adheres very strongly when in contact with the same coadhesive applied to another object and allowed to dry. Such coadhesives are known, for example from U.S. Pat. Nos. 4,430,843 and 7,037,564.

In particular, the coadhesive 12 is a L366 coadhesive manufactured by Baker Adhesives, a division of AMB Enterprises LLC of Newark, N.J.

In order to form the dunnage material 10, the paper strip 11, such as a Kraft paper, having a width of 6 inches and a continuous length, for example, in excess of 24 feet, is coated with the coadhesive 12 in any suitable manner, dried and wound into a roll.

Thereafter, the paper strip 11 is unwound from the roll and pulled through an orifice or other type of passage wherein the paper strip 11 is crumpled transversely thereby bringing random intermediate portions of the coated surface of the paper strip 11 into contact with each other. At this time, the coadhesive on the contacting portions of the paper strip 11 adheres the intermediate portions together in a permanent manner.

The length and width of the crumpled paper strip 11 may be of any suitable dimensions that allows the crumpled strip to be used as dunnage material between an item and a wall of a shipping carton or the like in which the item is placed. Typically, the width is from 3 inches to 24 inches and the length is from 12 inches to 36 inches.

Figure 3:
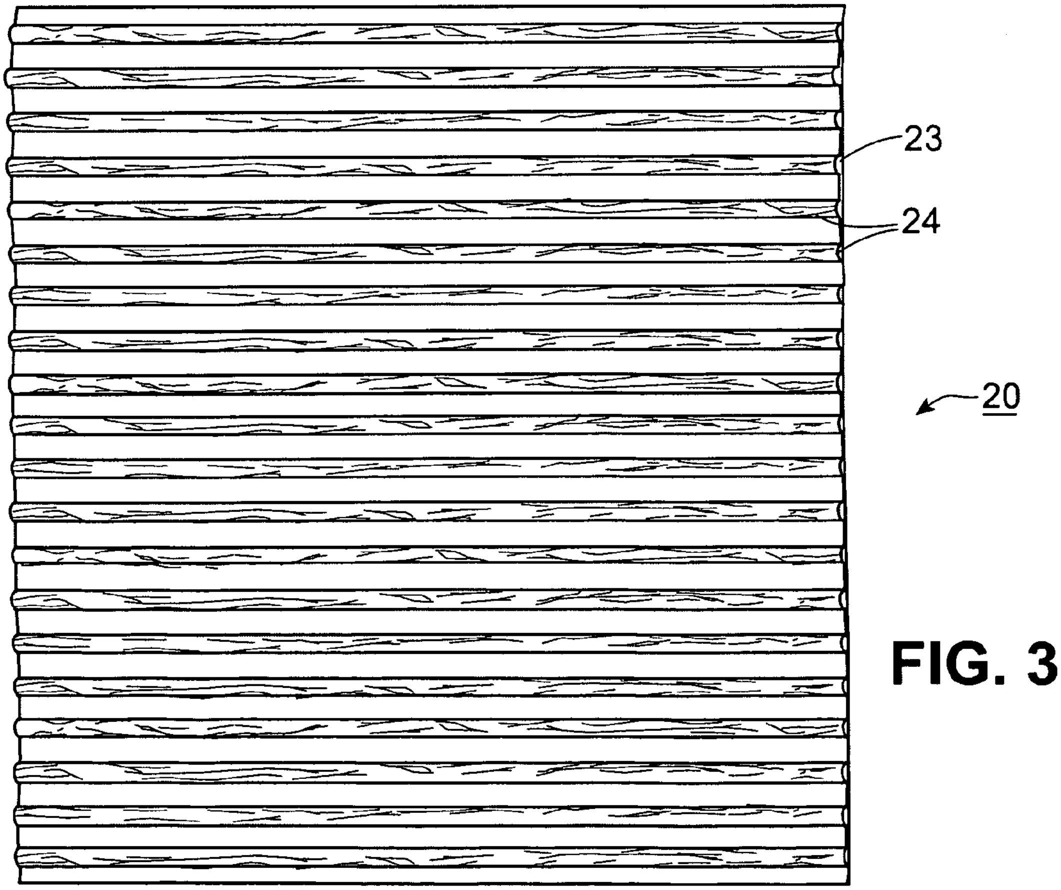
FIG. 3 illustrates a plan view of a packaging wrap constructed in accordance with the invention.
Figure 4:
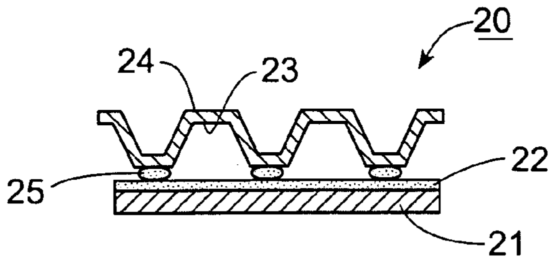
FIG. 4 illustrates a part cross sectional view of the packaging wrap of FIG. 3.

Referring to FIGS. 3 and 4, in another embodiment, a paper product for use as a packaging wrap 20 of two-ply construction is formed of a flat sheet of material 21 having a coadhesive 22 on one surface and a corrugated sheet of material 23 having corrugations 24 facing the flat sheet 21 and having a coadhesive 25 on the corrugations 24 that adhere the corrugated sheet 23 to the flat sheet 21 in a permanent manner. In this respect, the term "permanent manner" is intended to mean that the two sheets of material 21, 23 are securely held together and require a significant force to be peeled apart. This is in contradistinction to a pressure sensitive glue that might be used for adhering the two sheets together but is one that does not require any significant force to peel the two sheets from each other.

The corrugations 24 may be disposed in parallel to extend perpendicularly of the main direction of the packaging wrap 20 or in any other configuration, such as, angularly of the packaging wrap or parallel to the main direction of the packaging wrap 20. Also, the corrugations 24 may be disposed in a chevron manner or zig-zag manner or any other suitable configuration.

The packaging wrap 20 may be fabricated in sheet form, as viewed. In this case, the packaging wrap is made of any suitable size and shape depending upon the use to which the packaging wrap is to be placed.

Alternatively, the packaging wrap 20 may be wound into a roll. In this case, a desired length of packaging wrap 20 can be unwound from the roll and cut off from the remainder of the roll when placed in use.

Figure 5:
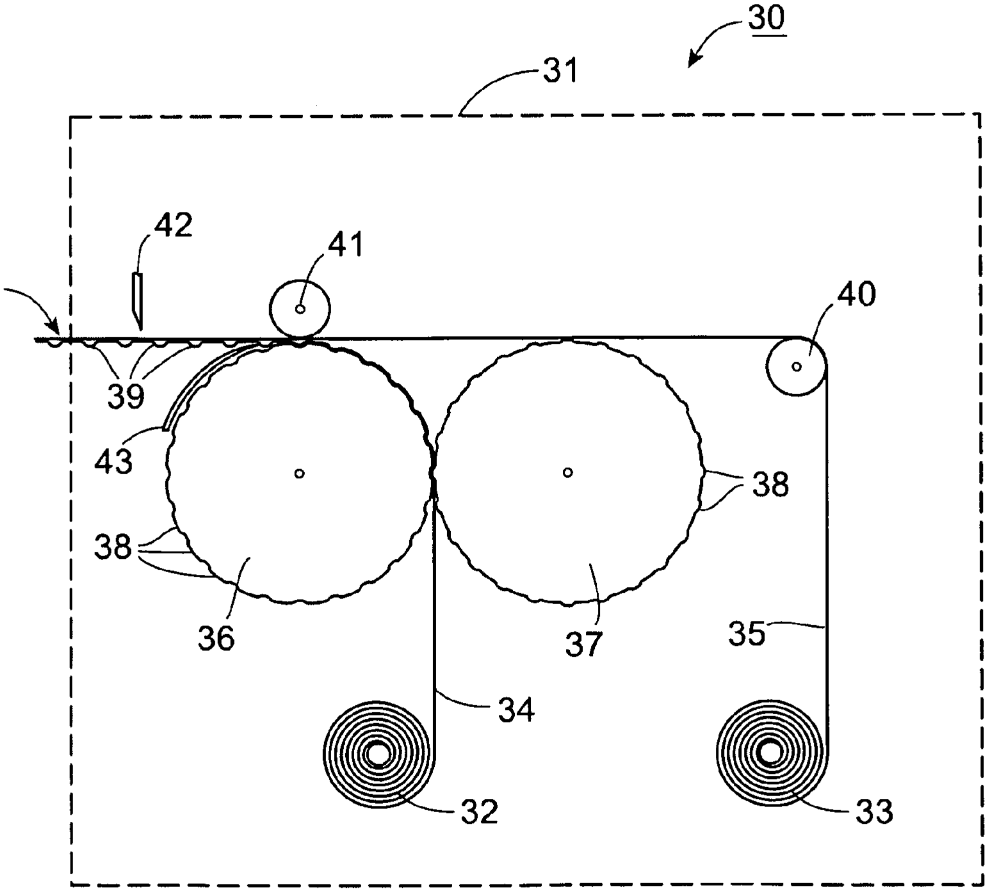
FIG. 5 illustrates a schematic cross-sectional view of an apparatus for making the packaging wrap of FIG. 3 in accordance with the invention.

Referring to FIG. 5, the apparatus 30 for forming the packaging wrap 20 is made of compact construction so as to be utilized at the point of ultimate use. Alternatively, the apparatus 30 may be made on a larger scale for the commercial production of the packaging wrap 20.

The apparatus 30 includes a housing 31 and means within the housing 31 for rotatably mounting two rolls of paper 32, 33, each of which is coated with a layer of coadhesive on one side, for unwinding of a paper stream 34, 35 from each roll 32, 33 in a synchronized manner and with the coadhesive sides facing each other.

In addition, the apparatus 30 includes a pair of rotatably mounted parallel rollers 36, 37 for receiving and conveying one of the paper streams 34 therebetween. Each of these rollers 36, 37 has a plurality of circumferentially spaced apart projections 38 for interengaging with the projections 38 of the other roller in order to impart a plurality of parallel pleats or corrugations 39 in the paper stream 34 conveyed therebetween. In addition, one roller 36 continues to convey the pleated stream 34 as illustrated. The rollers 36, 37 are heated in any suitable manner from 150° F. to 300° F. to "iron" in the corrugations 39 in the paper stream 34.

The apparatus 30 also employs a pair of guides 40, 41, such as rollers, for guiding the flat paper stream 35 over the rollers 36, 37 and pressing the stream 35 into contact with the corrugated paper stream 34 while still on the roller 36 at a point after the stream 34 has been corrugated so that the coadhesive on the corrugations 39 of the corrugated stream 34 adheres to the coadhesive on the flat paper stream 35 thereby forming a continuous stream of packaging wrap 20.

As indicated, the apparatus 30 is provided with a cutting device 42 in a form of a blade or serrated tear knife for cutting the continuous stream of packaging wrap 20 into discrete lengths.

As illustrated, the rolls of paper 32, 33 are located below the plane of the pleat forming rollers 36, 37 and the two streams of paper 34, 35 are guided vertically upwardly. One stream 34 is fed into the nip between the two pleat forming rollers 36, 37 while the other stream 35 is guided about the guide 40 to pass at a right angle over the pleat forming rollers 36, 37. The second guide 41 serves to press the flat stream 35 onto the pleated stream 34 while still on the pleating roller 36.

Figure 6:
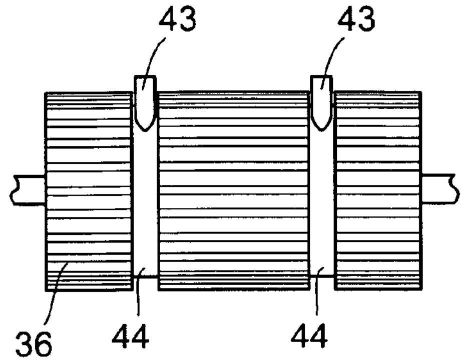
FIG. 6 illustrates a side view of the downstream corrugated roller of the apparatus of FIG. 5 with stripping pins for lifting off the formed packaging wrap in accordance with the invention.

Referring to FIG. 6, the downstream corrugated roller 36 of the apparatus of FIG. 5 is associated with a pair of stripping fingers or strips 43 for lifting off the formed packaging wrap 20. As indicated, the roller 36 is provided with a pair of spaced apart annular grooves 44. Each stripping finger 43 is fixed mounted by suitable means (not shown) within the housing 31 and is curved to have a forward end project into a respective groove 44 in order to lift the packaging wrap 20 out of the parallel grooves between the corrugations of the roller 36 should the packaging wrap 20 be stuck in these grooves as the roller 36 rotates.

The apparatus 30 may be operated on a manual basis, for example by a simple cranking mechanism (not shown) for cranking the pleating roller 36 shown to left in FIG. 5. This, in turn, drives the formed packaging wrap 20 out of the apparatus while at the same time pulling the flat stream of paper 35 from the supply rolls 33.

Alternatively, the apparatus 30 may be electrically driven by employing suitable motors for driving the respective rollers 36, 37 in synchronism.

Figure 7:
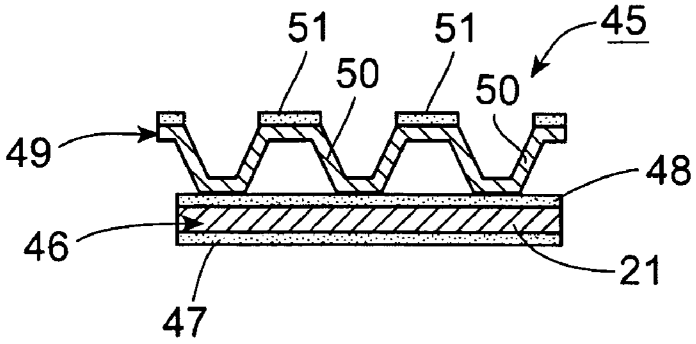
FIG. 7 illustrates a cross-sectional view of a multi-ply packaging wrap made in accordance with the invention.

Referring to FIG. 7, wherein like reference characters indicate like parts as above, in another embodiment, the packaging wrap 45 is made of multi-ply construction and is comprised of a flat sheet 46 that has a coadhesive 47 on an exposed surface and a heat sensitive glue 48 on an opposite surface and a corrugated sheet 49 that has corrugations 50 adhered to the heat sensitive glue 48 on the flat sheet 46 and a coadhesive 51 on the opposite exposed surfaces of the corrugations 50. The packaging wrap 45 thus has coadhesive 47, 51 on two oppositely disposed surfaces. This packaging wrap 45 may be wound about an item with the ends of the wrap adhered to each other to enclose the item.

The flat sheet 46 may be made of any suitable material. For example, where the flat sheet 46 is made of paper, the heat sensitive glue 48 may be a plastic with a low melting point, such as a polyethylene having a melt index of from 3 to 40 and may be coated onto one side of the paper 46. In any event, this packaging wrap 45 may be fabricated in the above-described apparatus with one or both of the corrugated rollers 36, 37 being heated to a degree sufficient to activate the heat sensitive glue 48 to adhere the two sheets 46, 49 together.

The multi-ply packaging wrap 45 may also have additional corrugated plies with coadhesive on one side adhered to the exposed coadhesive surface of the base wrap. In this way, the plies of the wrap may number, three, four, five or more.

Figure 8:
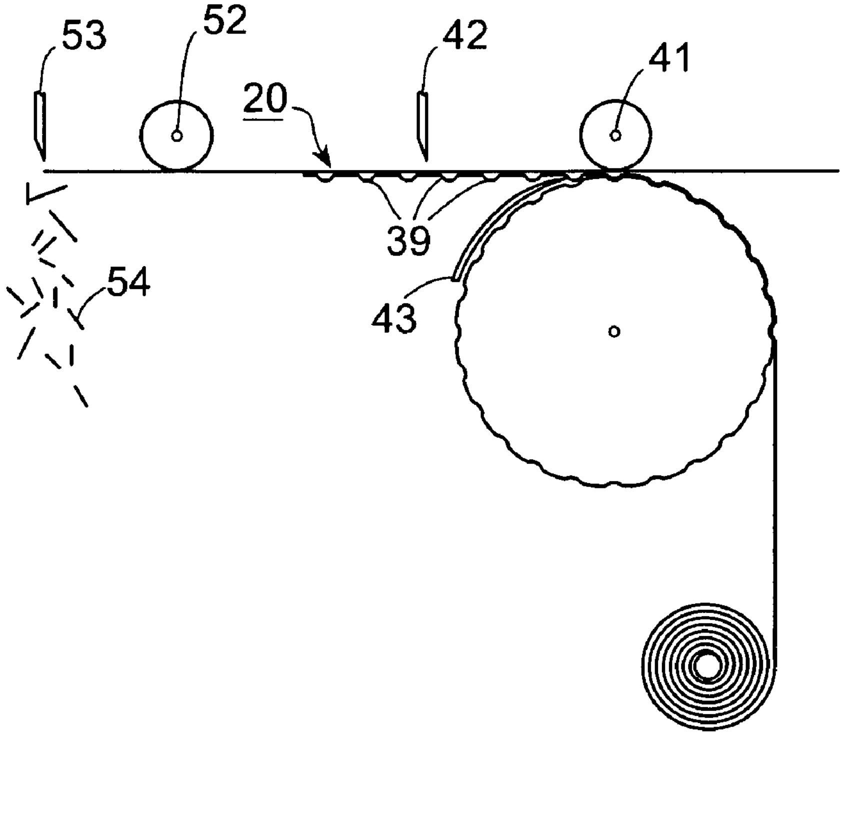
FIG. 8 illustrates a view of a modified apparatus for forming discrete pieces of dunnage.

Referring to FIG. 8, wherein like reference characters indicate like parts as above, the apparatus 30 of FIG. 5 may be further provided with a plurality of slitters 52 for slitting the wrap 45 into a plurality of thin parallel strips and a chopper 53 for chopping the strips into individual discrete elements or pieces of dunnage 54.

The resulting dunnage elements 54 are characterized in having a coadhesive on two opposite surfaces and can be used for packaging items within cartons and the like. In particular, each dunnage element 54 has a flat rectangular paper piece, a coadhesive on an exposed side of the flat piece, a corrugated paper piece having a plurality of corrugations adhered to the flat paper piece and a coadhesive on the exposed surfaces of the corrugations facing away from the flat piece.

For example, an opened carton may be placed at the exit of the apparatus 30 to receive a layer of discrete dunnage elements 54. Since these elements 54 have coadhesive on opposite exposed surfaces, when the elements 54 come into contact with each other, the elements will adhere together into a cohesive mass. Thereafter, a thin sheet or film of plastic may be lain over the cohesive mass to act as a separator and an item placed on the film. Next, if desired, a thin sheet or film of plastic may be lain over the item to act as a separator. The remainder of the carton is then filled with further dunnage elements from the apparatus 30 and the carton closed for shipping purposes or the like. When the carton arrives at a shipping destination, the carton can be opened and the top mass of adhered together dunnage elements removed. Then, the separator film is removed to expose the packaged item to view and for removal. The remaining film and cohered mass of elements may also be removed.

The invention thus provides a paper product that can be formed as a crumpled paper strip that can be used for dunnage material and that is able to retain a crumpled shape in a permanent manner.

In addition, the paper product can be formed as a packaging wrap of simple construction that is able to maintain its integrity in a permanent manner.

Also, the invention provides a paper product that can be formed as a plurality of discrete elements of small size for use in packing and packaging.

The invention also provides an apparatus for making packaging wrap in an economical manner. The apparatus is of compact construction and requires minimal space. Further, the apparatus may be employed on an on-demand basis. The construction of the apparatus is such that the cost of shipping a packaged item may be reduced.

The dunnage material and the packaging wrap may be any suitable material. Typically, the dunnage material would be made of Kraft paper or any other stiff type of paper. The packaging wrap may be made of Kraft paper, lightweight papers including tissue paper and the like.

What is claimed is:

1. A paper product comprising at least one flat sheet;

a coadhesive on an exposed surface of said flat sheet;

a heat sensitive glue on an opposite surface of said flat sheet from said coadhesive;

a corrugated sheet having corrugations adhered to said heat sensitive glue on said flat sheet; and a coadhesive on opposite exposed surfaces of said corrugations.

2. A paper product as set forth in claim 1 wherein said flat sheet is made of paper.

3. A paper product as set forth in claim 1 wherein said heat sensitive glue is a plastic with a low melting point.

4. A paper product as set forth in claim 3 wherein said heat sensitive glue is a polyethylene having a melt index of from 3 to 40.

5. A paper product as set forth in claim 1 further comprising a second flat sheet having a coadhesive on one side thereof adhered to said coadhesive on said corrugations and a second corrugated sheet adhered to said second flat sheet.

6. A paper product comprising a plurality of dunnage elements, each said dunnage element having a flat rectangular paper piece, a coadhesive on an exposed side of said flat piece, a corrugated paper piece having a plurality of corrugations adhered to said flat paper piece and a coadhesive on the exposed surfaces of said corrugations facing away from said flat piece.

* * * * *